Jan. 15, 1935. L. L. STEINDLER 1,987,950
AUTOMOBILE HEATER AND REGISTER CONTROL
Filed Dec. 31, 1928 3 Sheets-Sheet 1
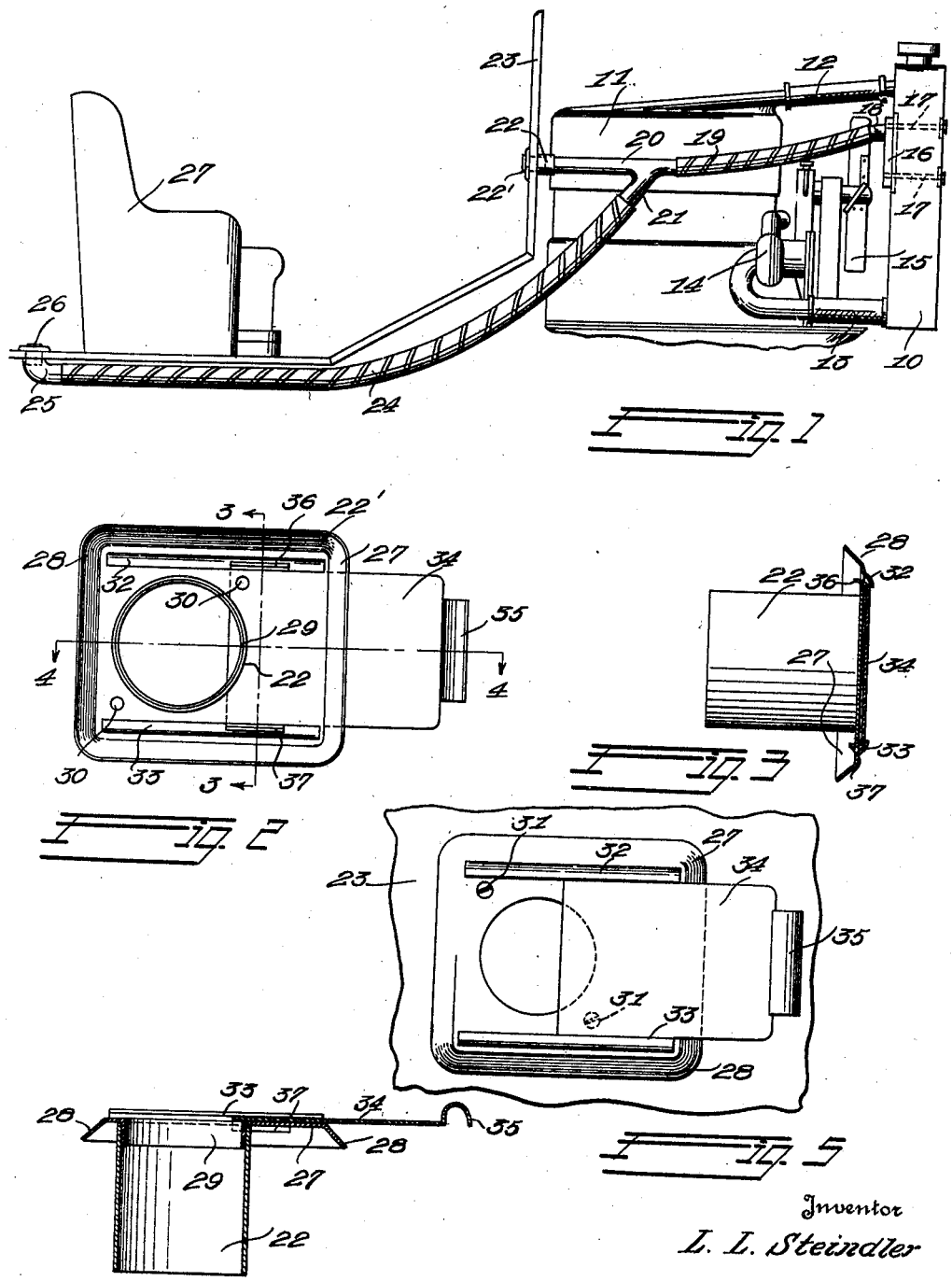
Inventor
L. L. Steindler
By Strauch & Hoffman
Attorneys Jan. 15, 1935. L. L. STEINDLER 1,987,950
AUTOMOBILE HEATER AND REGISTER CONTROL
Filed Dec. 31, 1928  3 Sheets-Sheet 2
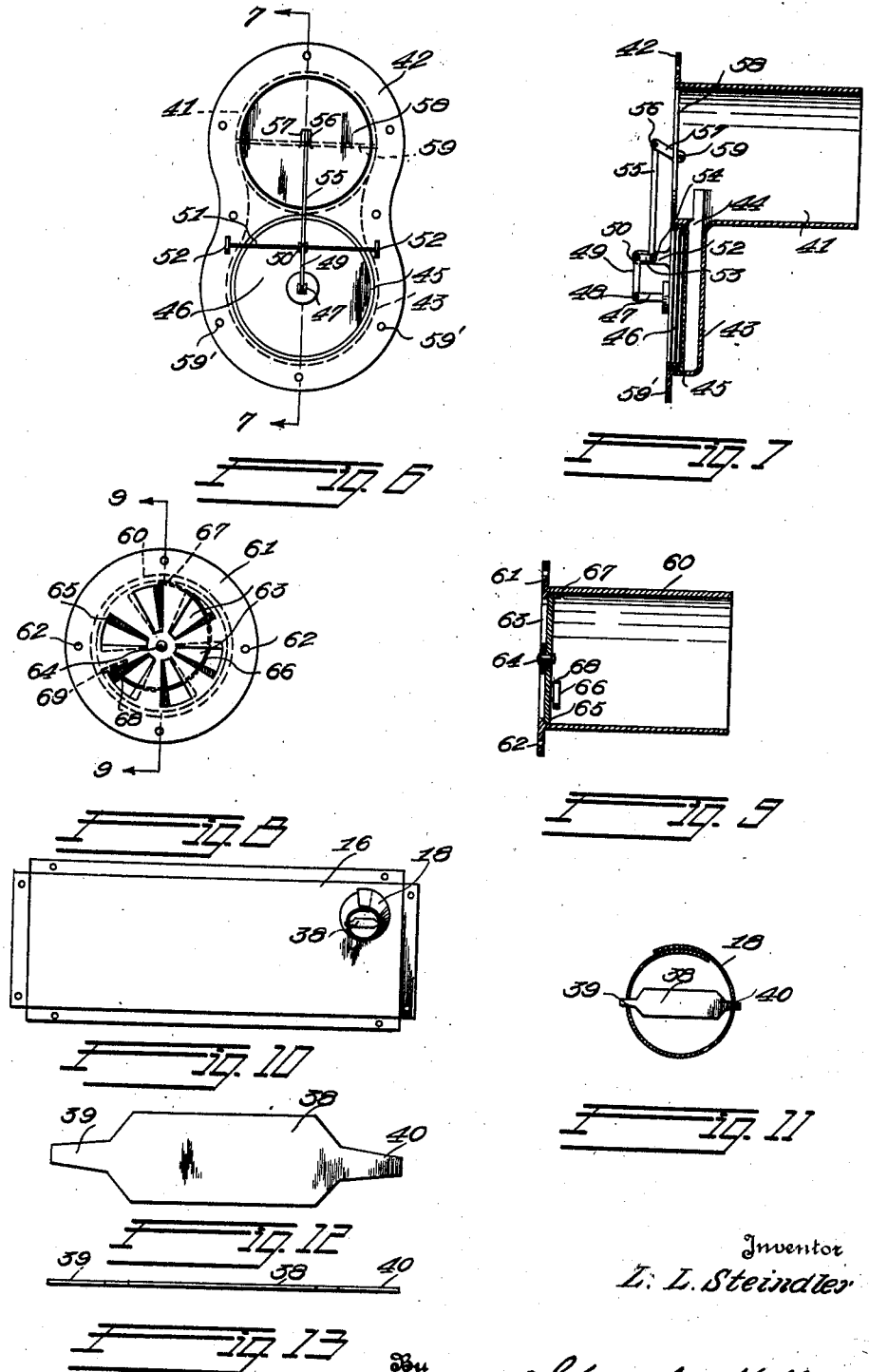
Inventor
L. L. Steindler
By
Strauch & Hoffman
Attorneys Jan. 15, 1935.　　　　L. L. STEINDLER　　　　1,987,950
AUTOMOBILE HEATER AND REGISTER CONTROL
Filed Dec. 31, 1928　　　3 Sheets-Sheet 3
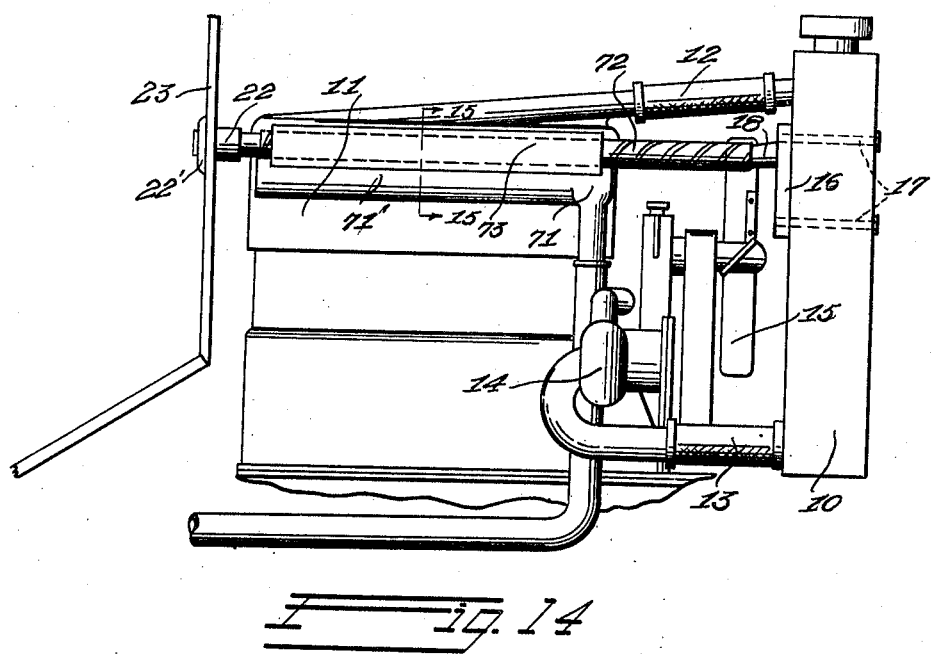
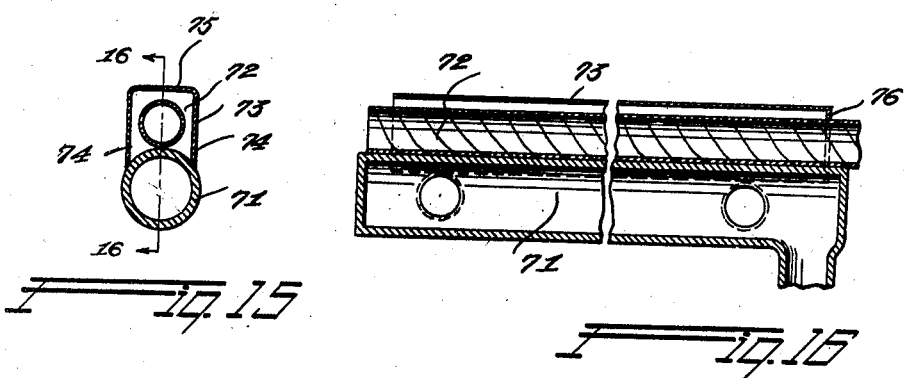
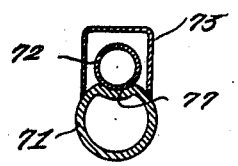
Inventor
L. L. Steindler
By
Strauch & Hoffman
Attorney Patented Jan. 15, 1935

1,987,950

UNITED STATES PATENT OFFICE 1,987,950

AUTOMOBILE HEATER AND REGISTER CONTROL

Leslie L. Steindler, Mamaroneck, N. Y., assignor of one-fourth to Charles B. Waters, Montclair, N. J., and one-fourth to Strauch & Hoffman, Washington, D. C., a partnership composed of William A. Strauch and James A. Hoffman Application December 31, 1928, Serial No. 329,600

4 Claims. (Cl. 236—1)

This invention relates to automobile heating systems and apparatus particularly of the type in which heated air is caused to flow into the automobile body from the exterior thereof.

Objections have been raised to the use of such systems because, for various reasons, a sensation of draft may be produced in the automobile body under certain conditions of operation. For example, in the heating system disclosed in my Patent 1,775,702, dated September 16, 1930, in which the air taken from in front of the radiator is permitted to flow into the automobile body under natural draft caused by the movement of the automobile, it sometimes happens that when the automobile is operated at high speed a sensation of coolness is caused, if the hand is placed several feet from the mouth of the register that is discharging air into the automobile body. This sensation of coolness is felt notwithstanding the fact that the air leaving the register may be considerably above 80° F. The high velocity of the air entering, even at this temperature and encountering the cooler air in the automobile body, produces the sensation similar to that produced by a draft. The same difficulty may arise in the type of heater in which the air is heated by contact with a heated part of the engine, such as a portion of the exhaust system, if the air in passing over such heated portions is caused to flow into the car body under the pumping action exerted by the fan ordinarily associated with the automobile engine, as has heretofore been proposed.

The primary object of this invention is to provide an automobile heating system including means to control the velocity of the air entering the automobile body to the end that relatively violent movements of the air causing the sensation above referred to may be avoided.

A further object of the invention is to provide automatic means to control the flow of heated air into the automobile body which means is so adjusted that the flow of air into the car body is stopped when the temperature thereof is below a predetermined point, and regulated in accordance with changes in temperature of said air.

A still further object of the invention is to provide a register to control the flow of heated air into the automobile body which register is extremely simple in construction, so that it may be produced and installed at a low cost.

A further object of the invention is to provide a register to control the flow of air into an automobile body from an automobile heater including a shutter to control the flow of air therethrough, which shutter is under the control of an element that is responsive to changes in temperature of the air about to enter the car body.

A still further object of the invention is to provide an extremely simple means whereby the velocity of the air flowing into an automobile body from a standard type of heating system under a circulation caused by the movement of the car body may be readily reduced by the addition to said system of an element that may be installed at practically negligible expense in a very short time.

A still further object of the invention is the provision of a heating system and apparatus comprising means for conducting heated air from the engine cooling system, and means for further heating said heated air by heat of the exhaust gases of said automobile without permitting the air to directly contact with parts of said exhaust system.

A still further object of the invention is the provision of a heating system and apparatus comprising means for conveying heated air from the radiator of the engine cooling system directly to the automobile body, said means being brought into proximity to the exhaust system for additionally heating said air by heat given off by the exhaust gases of the automobile.

Further objects of the invention will appear as a description thereof proceeds with reference to the accompanying drawings in which:—

Figure 1 is a diagrammatic fragmentary side elevation of an automobile showing one form of heating system to which this invention may be applied.

Figure 2 is a rear elevation of a manually operable register that may be used in the system shown in Figure 1.

Figure 3 is a sectional view taken on the plane indicated by the line 3—3 on Figure 2 looking in the direction of the arrows.

Figure 4 is a sectional view taken on the plane indicated by the line 4—4 in Figure 2, looking in the direction of the arrows.

Figure 5 is a front view of a portion of the dash of the automobile showing the register of Figures 2, 3 and 4 in applied position.

Figure 6 is a front view of a modified form of register that operates automatically and that may be used in place of that shown in Figures 2 to 5 inclusive.

Figure 7 is a sectional view taken on the line 7—7 of Figure 6.

Figure 8 is a front view of a further modification of an automatically operating register.

Figure 9 is a sectional view taken on the plane indicated by the line 9—9 on Figure 8, looking in the direction of the arrows.

Figure 10 is a rear view of the air collecting member shown in Figure 1 and including a simple arrangement for reducing the velocity of air flowing from the outlet of said member whereby a standard heating system may be readily converted into a system having smaller capacity.

Figure 11 is an enlarged sectional view showing the manner of application of said arrangement to said member.

Figures 12 and 13 are, respectively, plan and side elevational views of the element that is inserted in the outlet of the air collecting member to reduce the velocity of flow.

Figure 14 is a side elevational view more or less diagrammatic in nature of the forward part of an automobile comprising the engine and cooling system therefor and disclosing the application of a further modified heating arrangement forming a part of my invention.

Figure 15 is a transverse sectional view taken on a plane represented by line 15—15 in Figure 14.

Figure 16 is a broken longitudinal sectional view on line 16—16 in Figure 15.

Figure 17 is a view similar to Figure 15 disclosing a modified arrangement of that shown in the latter figure.

Like reference characters indicate like parts throughout the several figures.

In the drawings the numeral 10 indicates an automobile radiator of the ordinary cellular type, which radiator serves to cool the water caused to flow from a jacketed engine 11 through conduits 12 and 13 connecting said jacket and the radiator. The circulation of said cooling water may be caused by a pump, such as 14, or in any other way. A fan 15 operated by the motor may be disposed between it and the radiator in well known manner.

As more fully described in my patent above referred to, an air collecting member 16, preferably in the form of a sheet metal box, open at one side, and of relatively shallow depth is applied to the inside of the radiator 10 as by bolts 17. The air collecting member 16 is provided preferably adjacent one corner thereof (see Fig. 10) with an outlet 18 in the form of a frusto-conical tubular extension. As pointed out in said application, the degree of taper of said extension may be varied by varying the amount of overlap of the sections that form that extension. A conduit 19 is applied to said tapered extension at one end and at its other end is telescoped over one end of a tubular connecting member 20 having a branch 21 extending laterally therefrom. The other end of the tubular member 20 is telescoped in a sleeve-like tubular extension 22 of a register 22', the extension being preferably applied through an opening in the dash 23 of the automobile body. A conduit 24 is connected at one end to the lateral extension 21 of the member 20 and at its opposite end to a tubular extension 25 of a register 26 disposed in the rear portion of the automobile body preferably in the floor of the body in back of the front seat 27' as shown. The registers 22' and 26 may be of identical form except that the register 26 is provided with a tubular extension 25 that is disposed angularly with respect to the air discharge portion thereof.

The register 22' is shown on a larger scale in Figs. 2, 3, 4 and 5. It comprises a sheet metal body 27 in the form of a plate the edges of which are flanged at an obtuse angle with respect to the body of the plate as shown at 28. The plate 27 is provided with an opening surrounded by an inwardly extending flange 29. The sleeve 22 before referred to, is telescoped over the flange 29 surrounding said opening and secured thereto in any way. The body 27 is perforated at 30 to receive screws 31 by which it is secured to the dash 23.

Body 27 is provided with longitudinal and short transverse slits to form long tongues 32 and 33, the body of each of which is bent so that it is offset with respect to the body of plate 27. Said long tongues serve to slidably guide a shutter 34 in the form of a sheet metal plate having lateral extensions 36 and 37 (Fig. 2) flanged at their edges, which extensions are disposed beneath the overhanging guide tongues 32 and 33. The shutter 34 is provided with a suitable hand or finger hold 35 by which the position of the shutter may be adjusted with respect to the opening in the body 27. As shown in Figure 5 the shutter 34 is adjusted horizontally. Accordingly, it will remain in adjusted position either partially or wholly closing the opening through which heated air enters the automobile body.

In the operation of the invention so far described, during the operation of the automobile, air flows through the radiator and is collected in the air collecting member 16 from which it flows through the conduits 19 and 20 to the register 22'. A portion of the air entering the conduit 19 enters the lateral extension 21 of the member 20 through the conduit 24 to the register 26. If the water in the radiator 10 has not reached the temperature at which the air entering through registers 22' and 26 will be heated to the desired point, the shutter 34 in each of said registers may be kept closed. The ready flow of air through the radiator 10, or at least that portion that is covered by the air collecting member 16, is, accordingly, impeded with the result that the temperature of the water in the engine cooling system tends to rise more rapidly than would be the case if free circulation through said portion of the radiator were permitted. At the same time drafts of cold air into the body before the motor is warm are prevented by the arrangement just described. As the temperature of the water in the engine cooling system rises the shutter 34 may be opened manually and the position of said shutter may be regulated to admit the amount of heated air necessary to maintain the temperature of the air in the car body at the proper point. If a sensation of coolness should develop due for example, to the high speed at which the car is being operated, and the consequent high velocity at which the air enters the car body, the shutter 34 may be closed partially to in this way reduce the amount and velocity of the air that is permitted to enter the body.

It has been found that when a heating system such as just described, but proportioned for operation where temperatures are moderate, is put into operation in automobiles intended for operation at relatively high speed in portions of the country at which the average temperature is much lower that it is desirable that the amount of air that is permitted to enter the car body and the velocity of said air be reduced below the point for which the heating system was initially designed. In such installations the air collecting member 16 may be modified as illustrated in Figures 10 to 13 inclusive. As shown in these figures, a baffle member 38 in the form of a plate preferably simply stamped from sheet metal is applied to the outlet 18 of said member. The baffle member 38 includes a pair of laterally extending tongues 39 and 40 that may be entered in suitable slots provided, in the sides of the outlet 18 to receive them. Inasmuch as the outlet 18 is made in the form in which the diameter may be adjusted it will be understood that the tongues 39 and 40 can readily be entered in the slots provided in the sides of the outlet 18 by first enlarging the diameter thereof, and that said member can then be interlocked with said outlet by reducing the diameter thereof as described in my patent above referred to, such reduction in diameter causing the tongues to enter the openings provided to receive them. In this way the baffle member is very readily firmly fixed in position. Baffle members 38 of various shapes and sizes may be provided. If such members are added to the system that may be manufactured in a standard form it will be readily understood that the standard system may conveniently, and at negligible expense, be converted into a system that is especially designed to meet the particular but differing conditions existing at the locality in which the heating system is put into use.

The register shown in Figures 1 to 5 inclusive is intended for manual operation. If desired, a register provided with an automatic control means may be embodied in place of the manually operable register. One form of such an automatic register is shown in Figs. 6 and 7. Said form includes a tubular extension 41 that may receive a conduit that serves to convey the heated air to the car body as above described. Said register also includes an attaching plate 42 to which the tubular extension 41 is secured, and a relatively shallow laterally extending receptacle 43 opening into the tubular extension 41 as shown at 44. Set into the forward portion of the receptacle 43 is a suitable cell holder 45 containing an element 46, that may be in the form of a bellows containing a liquid having a relatively high coefficient of expansion so that when the member 46 is subjected to temperature changes it will vary substantially in thickness in accordance with such changes. Rigidly secured centrally to the member 46 is a stem 47, the end of which is pivoted at 48 to one end of a bell crank lever 49 pivoted between its ends at 50 to a shaft 51 that is journalled at its end in lugs 52 supported by flange 42. The other arm 53 of said bell crank lever is connected adjacent its end by means of a pin 54 to a link 55 that is pivoted at 56 to an arm 57 extending laterally from a butterfly valve 58 that is secured to a pivot pin 59, the ends of which are journalled in the sides of the tubular extension 41. The register just described may be set in an opening in the dash, and may be secured therein by fasteners entering the openings 59' provided in the flange 42.

In the operation of this form of the invention the element 46 at relatively low temperature maintains the butterfly valve 58 closed. As the temperature of the air in the tubular extension 41 rises and enters the receptacle 43 in back of element 46 said element is subjected to heat conducted through the walls of the cell 45, in which it is mounted, causing the temperature responsive element 46 to expand. As said element expands it causes the butterfly valve to turn upon its pivot 59 opening the register and permitting the flow of the heated air into the car body. As the temperature rises further the butterfly valve will be opened further. When the car is not in operation and the temperature of the air entering the tubular extension 41 drops the element 46 automatically contracts, thereby causing the butterfly valve to be closed. Said valve will remain closed until, during further operation of the car, the air that enters the tubular extension 41 is caused to reach a relatively high temperature.

A still further modified form of an automatically controlled register is illustrated in Figs. 8 and 9. This form includes a tubular extension 60 secured to a plate 61 that contains a plurality of openings 62 disposed around the periphery thereof, and through which fasteners are passed to secure it to the dash of the automobile body. Plate 61 is also provided centrally thereof with a plurality of openings 63 extending radially from a pivot 64. Secured to said pivot and arranged against the inner face of the plate 61 is a shutter 65 in the form of a plate provided with openings similar to the openings 63 before referred to. It will be readily understood that when the openings in the shutter 65 are brought into registry with openings 63 in plate 61, air is permitted to enter the car body through said openings. However, when the openings in shutter 65 are out of registry with the openings 63 of plate 61 the flow of air into the car body will be shut off. The movement of the shutter 65 may be automatically controlled by an element responsive to changes in temperature, which element is indicated by the numeral 66. Said element is constructed of a plurality of metals having substantially different coefficients of expansion arranged in laminated form so that when the bi-metallic element is subject to changes in temperature it tends to curve and assume a different form. Such an element is illustrated at 66 and said element may be secured adjacent one end at 67 to the tubular extension 60. The other end of said element carries a pin 68 entering slot 69 of shutter 65.

In the operation of this form of the invention the element 66 is arranged so as to maintain the openings 63 in plate 61 out of registry with the openings in shutter 65 at relatively low temperatures. As the temperature of the air in tubular extension 60 arises the element 66 will cause a shifting of the shutter 65 on its pivot until the openings therein are brought into partial or complete registry with the openings 63 in the plate 61 depending upon the temperature of the air in said extension.

The manual and automatically operable registers above described may be utilized in connection, not only with the type of heating systems illustrated on Figure 1 of the drawings, but it will be understood that they may be used in connection with heating systems in which the air is heated by contact with some heated part of the exhaust system of the motor or in the combined system illustrated in Figures 14 to 17 about to be described. It is apparent that the novel registers herein described may be conveniently used in such systems and it is intended to cover in this application the use of such registers in automobile heating systems of any kind.

Referring to Figures 14 to 16 inclusive wherein parts corresponding to those illustrated in Figure 1 are designated by the same reference characters, the engine 11 as in common practice is provided with an exhaust manifold 71 which may be of any standard construction and a conduit 72 similar in construction and function to conduit 19 above described is supported, on the longitudinal portion 71' of manifold 71 with one end thereof detachably connected to the outlet 18 of the air collecting member 16 and the other end thereof detachably connected to the extension 22 of register 22' or to any suitable control means located in the dash 23.

In accordance with this construction, heated air is conducted into the automobile body in the manner disclosed in the above referred to patent, and while the heated air is conducted only into the front portion of the automobile in accordance with the present disclosure, it is obvious that a branch connection which is shown in Figure 1 and in said patent may be provided for conducting part of the heated air to the rear portion of the automobile. The conduit 72 may if desired be secured by any suitable means to the manifold 71 and the manifold engaging portion of conduit 72 is surrounded by a three sided box member 73 having the sides 74 thereof engaging manifold 71 and suitably secured thereto.

As indicated in Figure 15 the sides 74 of box member 73 as well as the top 75 thereof are preferably disposed in substantial spaced relation to conduit 72 to provide an air space and the front end of box member 73 is closed by an end wall 76 for preventing a draft from the radiator through the air space within the box member.

In accordance with this construction, a portion of the otherwise waste heat generated by the exhaust gases and radiated from the manifold 71 is collected in box member 73 in contact with the enclosed portion of conduit 72 thus effecting a further substantial heating influence upon the already heated air passing through the conduit 72.

In operation, a portion of the air passing through the cellular body of the radiator 10 which is heated thereby, is collected in the box 16 and conducted through conduit 72 to the automobile body under natural draft in the manner disclosed in my patent above referred to.

The walls of conduit 72 are substantially heated by the heated air in box member 73 as well as by the contact of conduit 72 with manifold 71 and accordingly the air passing through conduit 72 is further heated by contact with said heated walls. It has been found that by the provision of the auxiliary exhaust heating means just disclosed the air entering the automobile body may be raised to a temperature of from 15° to 25° higher than without such auxiliary means.

In order to provide a more stable support for conduit 72 as well as provide a greater surface contact between conduit 72 and exhaust manifold 71, the manifold 71 may as indicated in Figure 17 be corrugated or fluted to provide a recess 77 of a surface contour conforming to the external surface of conduit 72 for receiving the conduit in surface to surface engagement as shown.

By the arrangement disclosed in Figure 17 not only is conduit 72 more effectively supported on manifold 71 but due to the greater surface contact between conduit 72 and manifold 71 the air passing through conduit 72 is heated to a higher degree than in the construction shown in Figure 15.

It will be observed that the heat radiated from the exhaust manifold is utilized without permitting the air that subsequently enters the car from directly contacting with any part of the exhaust gas system. No air from adjacent said system or from beneath the hood can accordingly enter the car body heating system. At the same time, a construction of great simplicity is provided since the air conduit need not be specially formed, and no necessity for the formation of tight joints at various points in the heating system arises. Furthermore a casing of very simple form for attachment to the exhaust system can be used, because the air or mixture of air and gases in said casing do not enter the car body.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I therefore claim as my invention:—

1. In a vehicle having a body and an internal combustion engine provided with a cooling system including a radiator, a chamber attached to the upper rear portion of said radiator and covering a large portion thereof and arranged to collect air passing through said radiator, a comparatively small outlet for said chamber, an air conduit between said outlet and said body, temperature responsive means in said conduit for preventing air from flowing past the radiator in front of said chamber and into said vehicle body until said radiator has reached a predetermined minimum temperature.

2. In a vehicle having a body and an internal combustion engine provided with a cooling system including a radiator, a chamber attached to the upper rear portion of said radiator covering a substantial portion thereof and arranged to collect air passing through said radiator, a comparatively small outlet for said chamber, an air conduit between said outlet and said body, a valve in said conduit, a second chamber in communication with said conduit between said first named chamber and said body, a temperature responsive device in said second chamber, means connecting said temperature responsive device and said valve whereby air flow is prevented from flowing through said first chamber and into said body until the air reaches a predetermined minimum temperature.

3. The combination as set forth in claim 1, and means in said conduit near said chamber to limit the maximum velocity of air flow through said conduit, whereby the air flowing through said conduit will be properly heated at high speeds of the vehicle and undesirable drafts in said vehicle body will be prevented.

4. In an automotive vehicle heating system for a vehicle having a body, an internal combustion engine and a radiator for cooling said engine, means attached to the upper rear portion of said radiator adjacent the portion into which a cooling medium enters when it is circulated from said engine for restricting the flow of air through said radiator, air conducting means connecting said first means and said body of said vehicle and temperature responsive means for restricting the air flow through the upper portion of said radiator and into said vehicle body until said radiator reaches a predetermined minimum temperature.

LESLIE L. STEINDLER.